Figure 6:
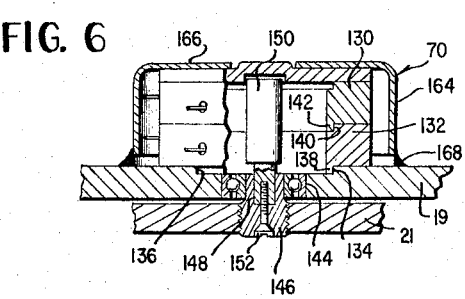

Aug. 23, 1966                C. L. CONKLIN, JR                3,267,748
                        PYROTECHNIC ROLL REFERENCE GYRO
Filed July 23, 1962                                       2 Sheets-Sheet 1
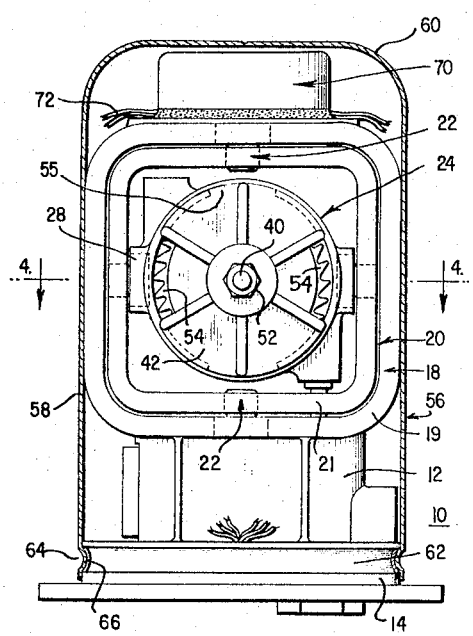
INVENTOR.
CLEMENT LLOYD CONKLIN, JR.
BY
Sughrue, Rothwell, Mion, and Zinn
ATTORNEYS.

Aug. 23, 1966  C. L. CONKLIN, JR  3,267,748
PYROTECHNIC ROLL REFERENCE GYRO
Filed July 23, 1962  2 Sheets-Sheet 2

INVENTOR.
CLEMENT LLOYD CONKLIN, JR.
BY
Sughrue, Rothwell, Mion, and Zinn
ATTORNEYS.

United States Patent Office 3,267,748
Patented August 23, 1966

3,267,748
PYROTECHNIC ROLL REFERENCE GYRO
Clement L. Conklin, Jr., Baltimore, Md., assignor to Martin-Marietta Corporation, Baltimore, Md., a corporation of Maryland
Filed July 23, 1962, Ser. No. 211,688
16 Claims. (Cl. 74—5.12)

This invention relates to a pyrotechnic-powered roll reference gyro having two-degrees-of-freedom and more particularly to a gyro of this type which may be manufactured of a minimum number of low cost, die cast or extruded parts.

Guidance systems which are utilized in missiles having relatively small destructive capabilities for operation over relatively short distances must of necessity be constructed of relatively inexpensive parts. However, in the area of reference devices, the reduction in cost cannot be achieved at the sacrifice of accuracy since a high order of guidance position is required due to the small effective radii of the warheads. One type of reference device or gyro that has found extensive use in applications of this type employs a turbine-type rotor which is driven by a stream of high-pressure gas through an associated jet aligned with the periphery of the rotor. In most cases the high-pressure gas results from the products of combustion of a solid propellant charge. The propellant charge is a one-shot affair in which a high-pressure gas is momentarily delivered to the turbine-type rotor, but is effective to produce an extremely high rotor speed. The rotor consists of sufficient mass and is provided with relatively low friction bearings, such that the momentum of the rotating turbine-type rotor is sufficient to operate the gyro for the limited time necessary to aid in guiding the missile from its point of takeoff to the target area.

Where the rotor is powered by the products of combustion of a solid propellant charge, the rotor and its associated support means are subjected to relatively high temperature and must be capable of withstanding the thermal shock of the abrupt temperature change. Since the rotor is positioned within the inner of the two gimbals, and since the solid propellant charge is conventionally located within a chamber of the housing exterior of the inner and outer gimbal assembly, the high-pressure gas is introduced through a retractable caging system which may include some means, such as a nozzle, which passes through aligned openings in the inner and outer gimbal assemblies. After gyro momentum is obtained, means are provided for moving the caging element out of the aligned openings within respective gimbal assemblies to allow the assembly to pivot with two-degrees-of-freedom. In the caged positioned, the caging nozzle may seat within another nozzle associated with the stator housing carrying the extruded rotor. The elements forming the gyro unit are generally covered by a cylindrical cover member which includes means for sealing the cover to the base frame. In systems of this type, rotation of the gyro frame about its longitudinal axis provides an electrical output by means of a commutator-brush assembly or potentiometer mounted on the top of a gyro. The commutator or potentiometer rotor is attached to the outer gimbal, which is held stationary by gyroscopic action.

A primary design problem in gyros of this type is the selection of materials and the configuration thereof to reduce the effects of tempearture-induced clearances in the rotor mounting. For optimum gyro design, the rotor is commonly formed of a dense material and the gimbals of a much lighter material; therefore, the differences in the coefficients of thermal expansion of the two materials induce problems of rotor fixity during temperature change.

It is, therefore, a primary object of this invention to provide an improved pyrotechnic-powered roll reference gyro which is constructed of a minimum number of die cast or extrusion formed parts in which problems due to difference in thermal expansion of the element are eliminated.

It is a further object of this invention to provide an improved, inexpensive pyrotechnic-powered roll reference gyro having an improved turbine assembly with increased ease in bearing setup and preloading, a high degree of compensation for temperature-induced relative dimensional changes and convenient and inexpensive inner gimbal balancing.

It is a further object of this invention to provide an improved reference gyro of this type having improved rotor acceleration characteristics, reduced gas turbulence within the turbine, and minimum rotor speed loss due to windage.

It is a further object of this invention to provide an improved reference gyro of the type employing a solid propellant charge for driving the gyro turbine in which the automatic uncaging means is greatly simplified.

It is a further object of this invention to provide an improved reference gyro of this type employing an improved commutator assembly and an integrally formed electrical lead conduit.

Further objects of this invention will be pointed out in the following detailed description and claims and illustrated in the accompanying drawings which disclose, by way of example, the principle of this invention and the best mode which has been contemplated of applying that principle.

Figure 7:
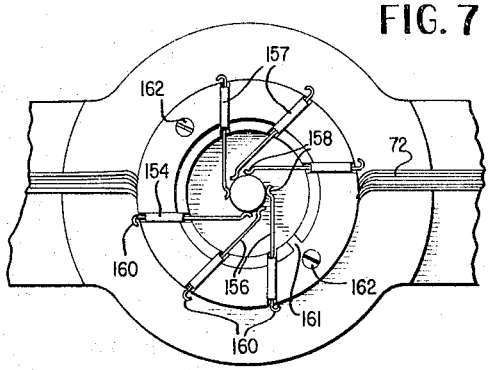
Figure 5:
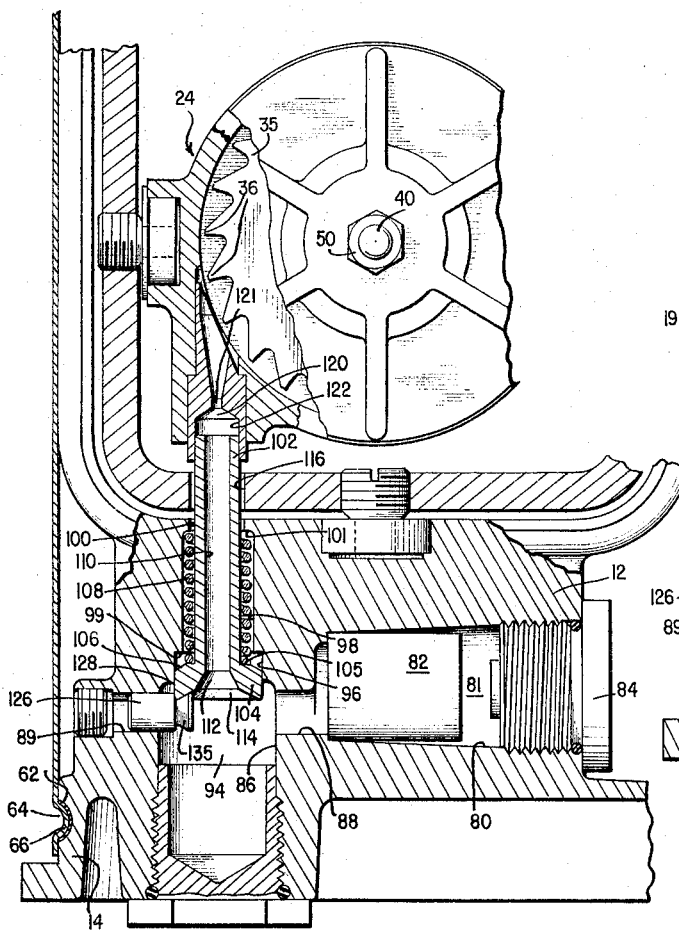
Figure 5A:
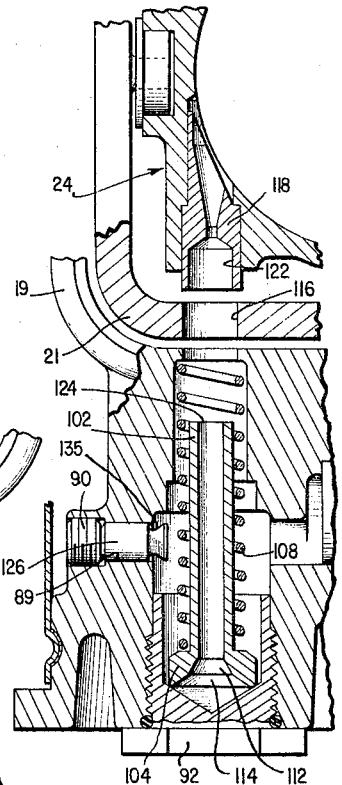

In the drawings:
FIG. 1 is a side elevational view, partially in section, of one form of the apparatus of the present invention;
FIG. 2 is a top-plan view of the cover for the apparatus shown in FIG. 1;
FIG. 3 is an elevational view, in section, of a portion of the cover of the embodiment of FIG. 1 taken along the lines 3—3 of FIG. 2;
FIG. 4 is a top, sectional view of a portion of the apparatus shown in FIG. 1 taken along lines 4—4;
FIG. 5 is a side elevational view, partially in section, of a portion of the apparatus shown in FIG. 1;
FIG. 5A is a side elevational view, in section, of the same portion of the apparatus shown in FIG. 5 with the caging nozzle-plunger retracted;
FIG. 6 is a side elevational view, in section, of the commutator assembly forming a portion of the apparatus shown in FIG. 1; and,
FIG. 7 is a top-plan view of the commutator assembly shown in FIG. 6.

In general, the invention in a preferred form resides in an improved roll reference gyro of the pyrotechnic-powered type including a relatively stationary gyro frame with an annular base and a flattened O-shaped frame member adapted to support inner and outer gimbal assemblies for pivotable movement about two axes with respect to the gyro frame member. The inner gimbal assembly includes an annular gimbal frame and a pair of disk-shaped, relatively thin side plates forming a working chamber therewith. A relatively dense rotor is positioned on a shaft of like material within the chamber by suitable bearings for rotation about the axis of the shaft with the shaft extending through the side plates and including threaded nuts for clamping the plates to the inner annular gimbal frame allowing the plates to flex freely to compensate for differences in thermal expansion of the members. Additional balancing nuts may be placed on the extending shaft to effect static balancing of the inner gimbal assembly about an axis perpendicular to the shaft axis. The inner gimbal assembly includes a fixed nozzle directed at the periphery of the rotor, and the gyro includes axially aligned apertures formed in the stationary frame member and the outer gimbal frame member which are aligned with the bore of the inner gimbal nozzle. A nozzle-plunger is slidably positioned within the stationary frame aperture and is adapted to move into the outer gimbal aperture and the nozzle bore for caging the gimbals with respect to the frame. A smaller bore is positioned at right angles to the aperture within the stationary frame and intersects the same. A piston is slidably positioned within the second bore and includes a notch formed therein. Common biasing means in the form of a spring surrounding the nozzle-plunger biases the nozzle-plunger to the uncaged position but is prevented from moving into this position by the locking action between the notch on the piston and the inner end of the nozzle-plunger. The large diameter of the nozzle-plunger is tapered to seat on a sharp edge of the stationary frame bore to effect a seal therebetween regardless of axial misalignment between the nozzle-plunger and the nozzle. A thin, sheet metal cover overlies the gyro frame member and includes a cylindrical portion surrounding the annular gyro base. The annular base includes a circumferential groove, and a band of sealing tape positioned within the groove adjacent the cover with the cover portion adjacent the groove being swaged into the groove to effect a hermetic seal and structural attachment therebetween. The cover includes a flat top portion including a pair of intersecting score lines to provide a localized, weakened area, with the high-pressure exhaust fluid rupturing the thin metal cover at this point upon ignition of the propellant charge. The thin side plates of the inner gimbal assembly include annular vents at a radius approximating the periphery of the rotor to reduce turbulence and to exhaust the high-pressure fluid in addition to vents circumferentially formed within the inner gimbal frame member. A rod-like commutator rotor is fixed to the outer gimbal assembly and rotates about one axis with respect to the fixed stationary frame member. A pair of annular, hollow block members of molded plastic are fixed to the stationary frame and include a plurality of radial slots within each member for holding individually single element brush members including rounded inner terminal ends forming a contact surface with the commutator rotor and rounded outer terminal ends for facilitating connection to electrical leads. The electrical leads pass between the flattened outer frame member and the cylindrical cover within a specially formed groove and are frictionally held therein.

Referring to the drawings, there is shown in FIG. 1, in a preferred form, the apparatus of the present invention. The apparatus comprises a two-degree-of-freedom roll reference gyroscope which is a pyrotechnic-powered device. The gyro 10 includes a cast frame member 12 including a base portion 14, and an integrally formed stationary frame assembly 18, consisting, principally, of a flattened O-shaped frame member 19. An outer gimbal assembly 20 consisting primarily of a flattened O-shaped frame member 21 of like configuration to that of member 19 is positioned within assembly 18 and is adapted to rotate freely about a vertical axis by means of opposed bearing assemblies 22. Within the outer gimbal assembly 20 is located an inner gimbal assembly, indicated generally at 24. This assembly includes a cast stator or inner gimbal frame member 26 which has opposed, enlarged side walls 28, with coaxial bores 30 receiving bearing 32 for permitting the stator frame 26 to rotate about a horizontal axis passing through the center of bearings 32. The bearing members 32 are coupled to the inner gimbal assembly 20 and more specifically to the inner gimbal frame member 21 by threaded connecting means 34, FIG. 4.

The position and configuration of these elements are quite conventional. However, the particular arrangement for assembling the inner gimbal assembly 24, the configuration of the elements making up this assembly, and the type of materials used are unique. The inner gimbal assembly 24 includes the inner gimbal frame 26, this frame member being annular in shape and formed of a light-weight metal, such as aluminum. In contrast to the inner gimbal frame, the rotor 35 is formed by extruding a relatively dense material, such as brass, and is given a desired configuration including a series of transverse rotor buckets 36, which extend fully around the periphery of the rotor. The brass rotor 35 is coupled by a pair of opposed bearing members 38 to a brass shaft 40 extending axially through the rotor assembly 24. The rotor 35 is held in position centrally of the inner gimbal frame 26 by the opposed aluminum side plates 42, which include central bores 44 for receiving the brass shaft 40. Each of the side plates 42 is formed with an annular rim 46 which bears against the sides 27 of the annular inner gimbal frame 26. With the bearings 38 fixed to opposite sides of the rotor 34 through the use of integral flanges 48, the complete assembly is clamped together by a pair of nuts 50, threadably mounted on opposite sides of the rotor shaft 40. As such, variation in temperature as a result of the high-temperature solid propellant gases passing through the turbine assembly, or variation in existing ambient temperature, causes the relatively thin cover plates 42 to flex to accommodate the main housing expansion, while the rotor bearing fit up is not changed since the shaft 40 and the rotor 35 are formed of the same material, in the preferred form, brass, and thus expand at the same rate. Since the shaft 40 has threaded ends to accommodate the nuts 50 for clamping the gimbal side plates to the inner gimbal frame 26, these threaded ends form a convenient attachment point for balancing weights in the form of additional nuts 52. The nuts 52 may be adjustably positioned along the length of the shaft to effect a balancing of the inner gimbal assembly about the horizontal axis formed by bearings 32. While FIG. 4 shows an assembly in which only one balancing weight 52 is provided at one end of the assembly only, it is apparent that nuts of different sizes and/or masses may be positioned on either end of the shaft 40 and spaced at varying distances from the clamping nuts 50 to achieve static balancing of the inner gimbal and rotor assembly 24.

A major advantage of the present invention is contained in the overall inner gimbal configuration, which includes an almost completely enclosed rotor having a pair of opposed vent slots 54 in the area adjacent to the nozzle. In addition, circumferentially spaced vents in the form of rectangular slots 55 are provided at intervals about the inner gimbal frame member. The semi-annular slots 54 are formed on opposed sides of the end plates occupying a circumferential distance of approximately 50°. Enclosing the rotor, which is not unique, prevents rotor speed loss due to windage during the coast down of the rotor 35 after the initial spin up as a result of combustion of the solid propellant fuel. Complete side enclosure without venting at the cover plates causes gas turbulence during the rotor spin up within the turbine assembly, which results in inefficiency due to the opposition effect to the rotation in a preferred direction as a result of the turbulence as well as increased metal erosion due to the failure of the gas to be adequately exhausted after it has delivered its energy in the form of thrust to the freely-rotatable rotor 35. By adding the opposed slots 54 in each cover plate in the area of the nozzle, the gas turbulence is greatly reduced since the gas can flow smoothly out of the rotor closure after impinging on the rotor buckets 36. This increases the efficiency of the energy transfer from the high-velocity gases to the rotor buckets 36 and also removes the possibility of cover plate erosion due to the turbulent hot gas being confined in direct contact with the cover plate. In addition, the use of the opposed slots 54 has the additional advantage of directing the exhaust gas against the adjacent gyro cover 56 where the soot and impurities resulting from combustion are deposited rather than spread through the gyro interior with likelihood of contamination of the more sensitive elements, such as the commutator assembly.

The gyro cover 56 is formed from light-weight sheet metal, such as aluminum, being cylindrical in configuration including a side wall 58, a closed top 60, and an open bottom. The cover includes two important features, the first directed to the method of hermetically and mechanically sealing the cover to the gyro assembly, and the second, to the provision for rupturing of the cover to allow the combustion product gases to escape readily from the gyro assembly after ignition of the solid propellant fuel. The base member 14 includes a peripheral groove 62 which extends completely around the assembly. The side wall 58 of the cover 56 is crimped or swaged at area 64 into groove 62 after the cover is positioned on the assembly. A band of silicon rubber sealing tape 66 is placed intermediate this cover portion 64 and groove 62 of the base 14 for forming both a structural attachment of the cover to the gyro and a hermetic seal. It is the cooperation between the silicon rubber sealing tape and the groove which allows the crimping action at 64 to effect both functions. The top 60 of the cover includes a pair of intersecting score lines 68, which form a relatively weakened zone near the center of the top of the cover but provide an efficient seal during the time that the gyro is not in use. After the solid propellant charge or other means is employed to deliver high-pressure gas to the turbine rotor 35 to effect desired momentum, the gas passing out through the spaced, annular slots 54, fills the (inside of the) cover 56. Since the gas after leaving the turbine is under a pressure generally in the order of 100 p.s.i., the cover 60 ruptures in the area defined by the score lines 68 to allow the gas to discharge. From FIG. 3, it is apparent that the score lines separate only a portion of the top 60 of the cover but do not pass completely therethrough, thus weakening this area and allowing the cover to rupture at an internal pressure in the order of 100 p.s.i.

It is conventional to use electric pick-off means for indicating the deviation of one of the members with respect to a reference member. In the present apparatus, an electric pick-off means includes a brush-holder assembly 70, which is mounted on the top of the gyro. The electrical leads 72 which extend therefrom, pass downwardly along the side wall of the O-shaped frame member 19 within a specially formed groove 74. The purpose of this groove is to allow the close-fitting side wall 58 of the cover to clamp the wires 72 in groove 74 between the cover 58 and the gyro frame member 19. With the exception of groove 74, the outer diameter of the frame member 19 is the same as the inner diameter of the cylindrical cover member 58 to provide a frictional contact between these two members at this point.

An important feature of the present invention is the extremely simplified, automatic uncaging mechanism for holding the inner and outer gimbal assembly in an in-line position with respect to the gyro frame assembly to insure the passage of the high-pressure gas from the combustion chamber to the combined turbine-type rotor and inner gimbal assembly during ignition of the charge. FIGS. 5 and 5A show this portion of the apparatus. The relatively stationary, cast gyro frame 12 includes a large transverse bore 80 forming a combustion chamber 81 and acting to hold the solid propellant fuel charge 82. This charge 82 is positioned within the chamber by removing the igniter 84 and its associated sealing means. A second large bore 86 at right angles to bore 80 form chamber 94 and intersects a reduced horizontal bore section 88 to effect communication between chambers 81 and 94. A third bore 89 aligned with bore 88 extends completely through the base portion of frame 12 and is closed by means of a threaded set screw 90. The vertical bore 86 is closed by a threaded end plug 92. The upper end of chamber 94 formed by bore 86 includes a series of counterbores of decreasing diameter indicated at 96, 98, and 100. A nozzle-plunger 102, which includes an enlarged portion 104 having a tapered outer surface 106, is positioned within chamber 94 and is spring biased by means of compression spring 108 tending to move nozzle-plunger 102 to a retracted position as indicated in FIG. 5A. One end of spring 108 abuts an end wall 101 formed adjacent reduced bore section 100 while the other end of the spring contacts surface 105 adjacent the tapered face 106 of the enlarged portion of the nozzle-plunger 102. The nozzle-plunger 102 is hollow and includes a central bore 110, which is enlarged at the lower end by tapered counterbore sections 112 and 114. The upper end of the nozzle-plunger 102 passes through an annular opening 116 which is formed within the outer gimbal assembly frame member 21 and may project within an expansion nozzle 118 forming a portion of the combined inner gimbal and stator frame member 24. The specific configuration of the nozzle member 118 and its position forms no portion of the present invention. An important feature of the present invention is the provision of the tapered contact surface 106 formed on the nozzle-plunger 102. Instead of requiring the nozzle-plunger 102 to move into sealing relation with the bore 96 through side wall contact surfaces 128, the nozzle-plunger 102, as a result of ignition of the solid propellant charge 82, moves upwardly against the bias of spring 108 to a position where the tapered forward end 106 abuts the sharp edge 99 between bores 96 and 98. The contact between the sharp edge 99 and tapered surface 106 provides sealing but still allows misalignment between the nozzle-plunger and inner gimbal assembly. In the position shown in FIG. 5, which is the position at rest prior to the ignition of the solid propellant charge 82, the nozzle-plunger projecting through aligned openings 100, 116, and bore 122 of the nozzle prevents the inner gimbal and turbine assembly 24 from rotating about its horizontal axis as well as preventing the outer gimbal assembly 20 from rotating about its vertical axis. To allow for misalignment of the inner gimbal assembly 24 relative to the stationary frame 12, bores 100 and 116 are elongated in the plane of FIG. 5.

The nozzle-plunger does not seat on the fixed nozzle 118. Seating is between the tapered surface 106 on the plunger land and the sharp-edged bore in the frame. The tapered surface on the plunger is provided to allow slight misalignment to exist between the fixed nozzle and the center-line of the nozzle-plunger; the tapered surface can then cant but still provide a fairly good seal. This eliminates having to provide a large clearance between bore 96 and land 128 to allow for misalignment. Such large clearance would allow play and inaccuracy of caged position, and would provide a leakage path during initial upward plunger movement before it seats. The frame and outer gimbal bores 100 and 116 are actually slots to allow for misalignment in the plane of FIG. 5.

In order to prevent the biasing spring 108 from moving the nozzle-plunger 102 from the position shown in FIG. 5 to a position shown in FIG. 5A, an extremely simple locking arrangement is provided. The simplicity of the uncaging mechanism of the present invention resides in the unique shape of the cage lock pin 126 and the nozzle-plunger 102. As mentioned above, the inner rim of the nozzle-plunger 102 includes an enlarged section having a tapered counterbore formed of two sections 112 and 114. The terminal tapered bore 114 acts in conjunction with the intersecting side walls 128 to provide mating surfaces which cooperate with the tapered groove 135 formed at the inner end of the lock pin 126. The lock pin 126 is free to slide within small transverse bore 89 and is manually moved to the position indicated in FIG. 5 after removal of the said screw 90. If the plunger 102 is in a position where the spring 108 is fully compressed, the grooved portion 135 of pin 126 can be moved into a position whereupon a slight release of the nozzle-plunger 102 under the action of the compressed spring 108, the elements will move into a pre-operation position as indicated in FIG. 5. Thus, it is apparent that the compression spring 108 not only acts to move the nozzle-plunger to a position shown in FIG. 5A after the full charge of pressurized gas passes through the chamber 94, but at the same time, to provide the locking force to lock the nozzle-plunger 102 into the position in which the inner and outer gimbal assemblies are fully caged and restrained from movement about their respective vertical and horizontal axes.

As a result of ignition of the solid propellant charge 82, the high-pressure gases entering chamber 94 act simultaneously on the face of the locking pin 126 as well as on the tapered surfaces 112 and 114 of the enlarged end 104 of the nozzle-plunger. The pressure increase causes the slidable locking pin 126 to move from right to left as indicated in FIG. 5 while the pressure at the same time acts on the face of the nozzle-plunger to fully contract the compression spring 108 and move the plunger upwardly to a point where the contact surface 106 of the plunger seats on the sharp edge 99 between bores 96 and 98 to deliver the pressurized, high-temperature gases against the peripherally formed buckets 36. This drives the rotor 35 at a high speed with the gases exhausting through the spaced, side vents 54 and peripheral vents 55 in a manner previously described. After discharge of the high-pressure, high-temperature gases from chamber 94, the biasing spring 108 causes the plunger to move to a retracted position as shown in FIG. 5A, whereupon the inner gimbal assembly 24 and the outer gimbal assembly 20 are free to rotate respectively about their horizontal and vertical axes with the momentum of the rotor 35 causing the system to operate for a predetermined period of time, normally in the order of a few minutes. Re-caging of the inner and outer gimbal assemblies is achieved by removing the end plug 92 and the set screw 90 and manually relocating the elements in the position shown in FIG. 5 by pushing the nozzle-plunger 102 forwardly against the bias of spring 108 and pushing the locking pin 126 from left to right until the tapered groove 135 of the locking pin is engaged with the surfaces 128 and 114 of the plunger. By this simple manner, with a relatively few elements, caging is manually accomplished and the apparatus is set up for automatic uncaging in response to ignition of a fresh solid propellant charge 82. When the nozzle-plunger 102 seats against the inner face of end plug 92, the extreme inner end 124 of the plunger is, of course, free of the previously aligned openings 116 and 122 in the inner and outer gimbal assemblies, respectively, and these members are free to rotate about their individual axes under normal operational conditions.

Another important aspect of this invention relates to the simplified, compact, commutator assembly which consists primarily of two identical injection-molded plastic brush holders 130 and 132. The upper brush holder 130 is concentric with the lower brush holder 132 with the two brush holders being in nested relation with each other and with the supporting surfaces formed by the O-shaped frame element 19. The brush holder assembly 70 is mounted on the gyro frame member 19 and disposed about the vertical axis formed by vertical bearing assembly 22. To accurately locate the two brush holders with respect to each other and with respect to the vertical axis, the gyro frame member 19 includes a counterbore 134. The lower brush holder 132 includes an annular rim 138 formed adjacent its inner peripheral surface with this rim 138 fitting within counterbore 134. In like manner, the upper part of brush holder 132 includes an annular recess 140, which acts to receive a second annular rim 142 formed adjacent the inner peripheral surface of brush holder 130. As mentioned previously, the outer gimbal assembly including the gimbal frame member 21 rotates with respect to the gyro frame member 19 about a vertical axis formed by bearing assembly 22. The bearing assembly may include a conventional ball bearing 144 having one race fixed to the gyro frame member 19 and the other fixed to a mounting pin 146 rigidly coupled to the outer gimbal frame 21. The pin 146 includes a central bore 148 at the upper end, which receives the rod-like commutator rotor 150. Screw member 152 holds the commutator rotor 150 within pin 146. Each of the brush holders 130 and 132 include radial slots or grooves 154, which receive the individual brushes. In the embodiment shown, each brush holder is provided with six spaced, radial grooves with the grooves generally being aligned tangent to the peripheral surface of the commutator 150. Each of the 12 grooves 154 contain identical brush members 156 which are cemented at 157 after the brushes have been adjusted for position with respect to the commutator 150. The brushes 156 are formed of a thin, conducting wire and include a radius 158 on the commutator end and may include a rounded, terminal portion 160 on the opposite end for aiding in making the necessary electrical connection to the lead wire 72. With the brush holders 130 and 132 in nested form and positioned on the gyro frame member 19, a pair of diagonally spaced screws 162 pass through vertical holes formed within each of the brush holders and act to rigidly secure the members together and to locate them on the frame. A locating tab locks the two elements together but not to the frame and with screws 162 locates the elements circumferentially of commutator rotor 150. It is to be noted that the commutator assembly includes brushes which require no specific contacts other than those formed by the wire brush member itself at the point where the brush contacts the commutator rotor, nor are separate terminals formed at the opposite end 160 where the leads contact the brushes. In order to prevent contamination of the brush assembly by the corrosive combustion gases resulting from the ignition of the solid fuel propellant charge 82, suitable sealing means are employed. These sealing means may take the form of a cover member including a side wall 164, a top portion 166, which may be formed integrally or of individual sections which are bonded together. The cover member is positioned on the assembly and sealed to the outer surface of gyro frame member 19 by conventional plastic sealing paint 168 or other means.

It is apparent from the above description that the present invention provides a compact, roll reference gyro having two-degrees-of-freedom, which may be advantageously powered by ignition of a pyrotechnic material, capable of being mass produced through the use of low-cost materials and processes, in which the major components are either die cast or extruded. The use of relatively thin, die cast aluminum side plates for the turbine assembly in conjunction with an extruded brass rotor mounted on a brass shaft insure ease in bearing set up and allows simplified preloading of the bearings by deflection of the side cover plates. This preloading compensates for temperature-induced relative dimensional changes between the rotor and the inner gimbal assembly along with the advantageous use of a shaft and rotor formed of the same material to eliminate temperature-induced relative dimensional changes between these members. Static balancing of the inner gimbal assembly is conveniently and inexpensively achieved by the mere addition of the balancing nuts applied to the extended ends of the rotor support shaft. Windage losses are minimized by substantially enclosing the rotor with the advantageous location of side vents permitting discharge of the gas without excessive turbulence within the turbine structure. The side venting directs the corrosive gases toward the inner surfaces of a cover which is provided with a weakened section to allow ready discharge of the spent gases from the gyro assembly while protecting the assembly from the ambient during the period of nonuse. The cover is hermetically sealed and structurally attached in an advantageous and simplified manner through the use of a cooperating groove, a strip of silicon rubber tape, and the localized swaging of the cover adjacent the annular groove of the base plate. The simplified caging arrangement requires only the caging piston itself, or nozzle-plunger, an additional restraining member, and a common biasing spring for insuring locking of the gimbals during nonuse and the automatic retraction of the caging piston subsequent to the ignition of the pyrotechnic charge. Simplification of the electrical system is achieved by providing a pair of brush holder blocks supporting radially directed brushes having integral terminals and contact members with the electrical leads advantageously located in a specially formed groove between the cover member and the gyro frame to prevent displacement of the electrical leads during operation of the device. While the preferred embodiment makes use of solid propellant charge to produce the high-pressure gas, the present invention has application to devices of this nature which make use of either a liquid propellant for providing momentum to the rotor or the substitution of a stored, compressed gas power source as the means.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An improved roll reference gyro of the pyrotechnic-powered type comprising: a relatively stationary gyro frame, at least one gimbal assembly pivotably mounted to said gyro frame, said gimbal assembly including a fixedly-mounted nozzle, said gyro frame member including an axially aligned bore terminating at its inner end with a counterbore forming a sharp edge therebetween, a hollow nozzle-plunger mounted for reciprocation in said bore for movement into said nozzle, said nozzle-plunger including an enlarged portion at its inner end, an annular tapered seating surface on said enlarged portion of said nozzle-plunger adjacent said sharp edge, said gimbal assembly further including a rotor associated with said nozzle provided on its periphery with vanes adapted to receive a blast of fluid to effect rotation thereof, and means effective during the delivery of pressurized fluid to said rotor for causing said tapered seating surface of said nozzle-plunger to move into said counterbore and to effect a seal with said sharp edge whereby said seal will not be broken in the event of axial misalignment between said nozzle-plunger and said nozzle.

2. An improved roll reference gyroscope of the pyrotechnic-powered type comprising a relatively stationary gyro frame, at least one gimbal assembly pivotably mounted to said gyro frame, said gimbal assembly including a fixed nozzle including an inlet throat and a rotor positioned adjacent thereto whereby pressurized fluid passing through said nozzle causes high-speed rotation of said rotor, said gyro frame including a bore formed coaxially of said nozzle, and terminating at its inner end in a counterbore forming a sharp edge therebetween, a hollow nozzle-plunger, having an enlarged inner end, mounted for reciprocation within said bore for movement into said nozzle throat, an outwardly flared annular surface on said enlarged inner end adjacent said sharp edge, and means effective during delivery of high-pressure fluid through said nozzle-plunger for causing said nozzle-plunger to move into said throat with said flared surface of said nozzle-plunger abutting said edge to effect a seal therewith regardless of axial misalignment between the said nozzle-plunger and said nozzle.

3. An improved gimbal and turbine assembly for use in a roll reference gyro of the pyrotechnic-powered type having at least one gimbal pivotably mounted on a relatively stationary gyro frame, said assembly comprising: a light metal annular gimbal frame, a pair of disk-shaped, relatively thin side plates in the form of a light metal casing and formed of a material having a coefficient of expansion similar to the coefficient of expansion of the material from which said gimbal frame is formed, positioned on each side of said annular gimbal frame and connected thereto forming a working chamber therewith, each of said plates including a central aperture therethrough, a heavy metal rotor positioned within said chamber, a shaft positioned coaxially of said side plates and said rotor and formed of a material having a coefficient of expansion similar to the coefficient of expansion of the material from which said rotor is formed, bearing means fixed to said shaft for supporting said rotor for rotation about said shaft axis within said working chamber, and means on said shaft, exterior to said side plates, for clamping said side plates to said frame member whereby said rotor is located centrally of said working chamber with said flexible side plates acting to compensate for temperature-induced expansion-differentials between said rotor and shaft members and said gimbal frame and side plate members.

4. Apparatus as claimed in claim 3 wherein said metal forming said shaft and said metal forming said rotor is brass.

5. Apparatus as claimed in claim 3 wherein the portion of said shaft exterior of said side plates is threaded and said clamping means comprise nuts threadedly mounted on said shaft.

6. Apparatus as claimed in claim 5 wherein balancing means in the form of additional nuts are threadedly mounted on said shaft exterior of said clamping nuts for providing static balance about an axis transverse to the shaft axis.

7. An improved gimbal and turbine assembly for use in a roll reference gyro of the pyrotechnic-powered type having at least one gimbal pivotably mounted on a relatively stationary gyro frame, said assembly comprising: an annular gimbal frame, a pair of disk-shaped, relatively thin side plates positioned on each side of said annular frame forming a working chamber therewith, each of said plates including a central aperture therein, a rotor of relatively dense material positioned within said chamber, a shaft positioned coaxially of said side plates and said rotor, bearing means fixed to said shaft for supporting said rotor for rotation about said shaft axis within said chamber, a nozzle formed within said annular gimbal frame for directing pressurized fluid at the periphery of said rotor for causing the same to rotate about said shaft axis, and at least one annular vent formed within each of said side walls at a radial distance from said shaft adjacent said rotor periphery for allowing said high-pressure fluid to exhaust from said rotor after delivering fluid induced momentum thereto whereby turbulence of said fluid flow within said chamber is minimized and windage losses of said rotor are greatly reduced.

8. An improved gimbal and turbine assembly for use in a roll reference gyro of the pyrotechnic-powered type having at least one gimbal pivotably mounted on a relatively stationary gyro frame, said assembly comprising: an annular gimbal frame, a pair of disk-shaped, relatively thin side plates positioned on each side of said annular frame and forming a working chamber therewith, each of said side plates including a central aperture therein, a rotor including peripheral buckets positioned within said chamber, a shaft passing through the apertures of said side plates for mounting said rotor for rotation within said chamber, a turbine nozzle formed within said annular gimbal frame having a discharge axis tangent with said peripheral buckets, and at least one semi-annular vent formed within said side walls at a radius generally equal to the bucket periphery whereby high-pressure fluid entering said chamber from said nozzle impinges on said buckets and is discharged from said chamber through said semi-annular vent with minimum turbulence of said fluid in said chamber and with maximum reduction in windage losses of said high-speed rotor.

9. In combination; a roll reference apparatus including a relatively stationary frame member, at least one gimbal assembly pivotably mounted with respect to said frame member for rotation about a given axis, a rod-like commutator rotor fixedly attached to said gimbal assembly and adapted to rotate about said axis with respect to said fixed stationary frame member, at least one annular, hollow block member formed of insulating material mounted concentric to said commutator rotor and fixed to said stationary frame member, a plurality of radial slots formed within and extending through said annular block member in tangential relationship to said commutator rotor, single element substantially straight brush members positioned within said radial slots and means for cementing said brush members to said block with the inner ends of said brush members in contact with said commutator rotor.

10. Apparatus as claimed in claim 9 wherein said radial slots are formed along a line tangential to the peripheral surface of said rod-like commutator rotor and said single element brush members include a rounded inner terminal end forming a contact surface with said commutator rotor and a rounded outer terminal end for facilitating connection to electrical leads.

11. In combination; a roll reference device including a relatively stationary frame member, at least one gimbal assembly pivotably mounted with respect to said frame member about one axis thereof, a rod-like commutator rotor fixedly attached to said gimbal assembly and adapted to project through said stationary frame member for rotation relative thereto, a pair of nested, hollow, annular brush supporting blocks formed of molded plastic and including cooperating surfaces having radial and circumferential locating means for locating said nested blocks with respect to each other, a plurality of spaced, radially extending slots formed within and extending through each of said blocks in tangential relationship to said commutator rotor, a single element substantially straight wire brush member positioned within each of said slots and means for cementing said brush members within said slots with the inner terminal end of said brush members in contact with said rod-like commutator rotor and the outer terminal end of said brush members projecting radially from said annular block for connection to associated electrical leads.

12. In combination; a roll reference gyro including a stationary frame member of O-shaped configuration including a flattened side wall, a relatively thin sheet metal cover member overlying said stationary frame member and having a portion in close contact with said flattened wall, a groove formed within said flattened wall portion adjacent said cover member, a commutator assembly fixedly positioned on said relatively stationary gyro frame member including a plurality of electrical leads extending from said assembly to the base of said stationary gyro frame, said leads being positioned within said groove whereby placement of said sheet metal cover on said gyro frame acts to frictionally restrain said leads in said groove between said cover member and said flattened side wall.

13. An improved, hermetically sealed roll reference gyro of the pyrotechnic-powered type including: a relatively stationary frame member having an annular base portion, a unitary cover member formed of thin sheet metal and adapted to surround said gyro having a flattened top portion provided with a pair of intersecting score lines to effect a localized weakened area whereby high-pressure exhaust fluid as a result of ignition of said pyrotechnic charge causes rupture of said thin metal cover along said score lines to effect venting of said sealed gyro, said cover member including an annular wall portion of a diameter substantially the same as said annular base portion of said gyro frame, a circumferential groove formed within said annular base portion, a band of silicon rubber sealing tape positioned between said annular wall portion and said annular base member and within said groove, said annular wall portion being swaged inwardly within said groove with sufficient pressure to form a hermetic seal and a structural attachment between said cover member and said annular frame portion of said gyro frame.

14. In combination: a roll reference apparatus including a relatively stationary frame member having an annular groove, at least one gimbal assembly pivotably mounted with respect to said frame member for rotation about a given axis, a rod-like commutator rotor fixedly attached to said gimbal assembly and adapted to rotate about said axis with respect to said fixed stationary frame member, at least one annular hollow insulating block member formed of molded plastic and including an annular rim about one periphery thereof adapted to fit in said annular groove of said stationary member whereby said plastic block member is mounted concentric to said commutator rotor and fixed to said stationary frame member, a plurality of radial slots formed within said annular block member, single element brush members positioned within said radial slots and means for cementing said brush members to said block with the inner ends of said brush members in contact with said commutator rotor.

15. In combination: a roll reference device including a relatively stationary frame member, at least one gimbal assembly pivotably mounted with respect to said frame member about one axis thereof, a rod-like commutator rotor fixedly attached to said gimbal assembly and adapted to project through said stationary frame member for rotation relative thereto, a pair of nested, hollow, annular brush supporting blocks formed of molded plastic and including cooperating surfaces having radial and circumferential locating means for locating said nested blocks with respect to each other, a plurality of spaced radially extending slots formed within each of said blocks, each said slot extending along a line tangent to the peripheral surface of said rod-like commutator rotor, a single element wire brush member positioned within each of said slots including a rounded inner terminal contacting said commutator rotor surface and a rounded outer terminal end projecting radially from said annular block for connection to associated electrical leads and means for cementing said brush members within said slots.

16. In combination: a roll reference apparatus including a relatively stationary frame member, at least one gimbal assembly pivotably mounted with respect to said frame member for rotation about a given axis, a rod-like commutator rotor fixedly attached to said gimbal assembly and adapted to rotate about said axis with respect to said stationary frame member, at least one annular hollow block member formed of insulating material mounted concentric to said commutator rotor and fixed to said stationary frame member, a plurality of radial slots formed within said annular block member in substantially the same plane located perpendicular with respect to said axis, single element brush members positioned within said radial slots and means for cementing said brush members to said block with the inner ends of said brush members in contact with said commutator rotor.

References Cited by the Examiner

UNITED STATES PATENTS

| | | | |
|---|---|---|---|
| 1,510,487 | 10/1924 | Macfarlane et al. | 74—5.7 |
| 2,301,700 | 11/1942 | Heintz | 74—5 X |
| 2,415,899 | 2/1947 | Meyer et al. | 74—5.12 |
| 2,641,134 | 6/1953 | Kenyon | 74—5.7 X |
| 2,771,778 | 11/1956 | Ryberg | 74—5 |
| 2,766,625 | 10/1956 | Swanson | 74—5 |
| 2,960,877 | 11/1960 | Still et al. | 74—5.12 |
| 3,186,241 | 6/1965 | Blanding et al. | 74—5.12 |

FOREIGN PATENTS 549,310  4/1932  Germany.

FRED C. MATTERN, Jr., *Primary Examiner.*

BROUGHTON G. DURHAM, *Examiner.*

K. J. DOOD, P. W. SULLIVAN, *Assistant Examiners.*